United States Patent [19]

Gagosz et al.

[11] Patent Number: 5,037,183

[45] Date of Patent: Aug. 6, 1991

[54] LASER DRILLING

[75] Inventors: Ronald Gagosz, Farmington; Richard W. Frye, Coventry, both of Conn.

[73] Assignee: United Technologies Corporation, Hartford, Conn.

[21] Appl. No.: 314,006

[22] Filed: Feb. 22, 1989

[51] Int. Cl.[5] .................... G02B 26/08; B23K 26/00
[52] U.S. Cl. ................... 359/212; 219/121.7; 219/121.72; 359/900
[58] Field of Search ............... 350/320, 321, 6.5, 6.9; 219/121, 121.34, 121.7, 121.23, 121.72; 408/700–705

[56] References Cited

U.S. PATENT DOCUMENTS

| | | | |
|---|---|---|---|
| 4,074,104 | 2/1978 | Fulkerson | 219/121.34 |
| 4,265,254 | 5/1981 | Koch et al. | 131/281 |
| 4,378,480 | 3/1983 | Langhans | 219/121.7 |
| 4,499,361 | 2/1985 | Brinker | 219/121 LK |
| 4,608,480 | 8/1986 | Bizot et al. | 219/121 |
| 4,640,382 | 2/1987 | Hartmann et al. | 181/175 |

FOREIGN PATENT DOCUMENTS 61-1493  1/1986  Japan.
1593268  7/1981  United Kingdom.

Primary Examiner—Bruce Y. Arnold
Assistant Examiner—James Phan
Attorney, Agent, or Firm—Edward L. Kochey, Jr.

[57] ABSTRACT

A plurality of holes are drilled with a repetitively pulsed laser. The time between pulses at one drilling location is utilized to drill the other holes. A rotatable mirror controllably directs the beam to the focusing lens. The distance between the mirror and the lens determines whether the drilled holes are parallel or divergent.

8 Claims, 1 Drawing Sheet

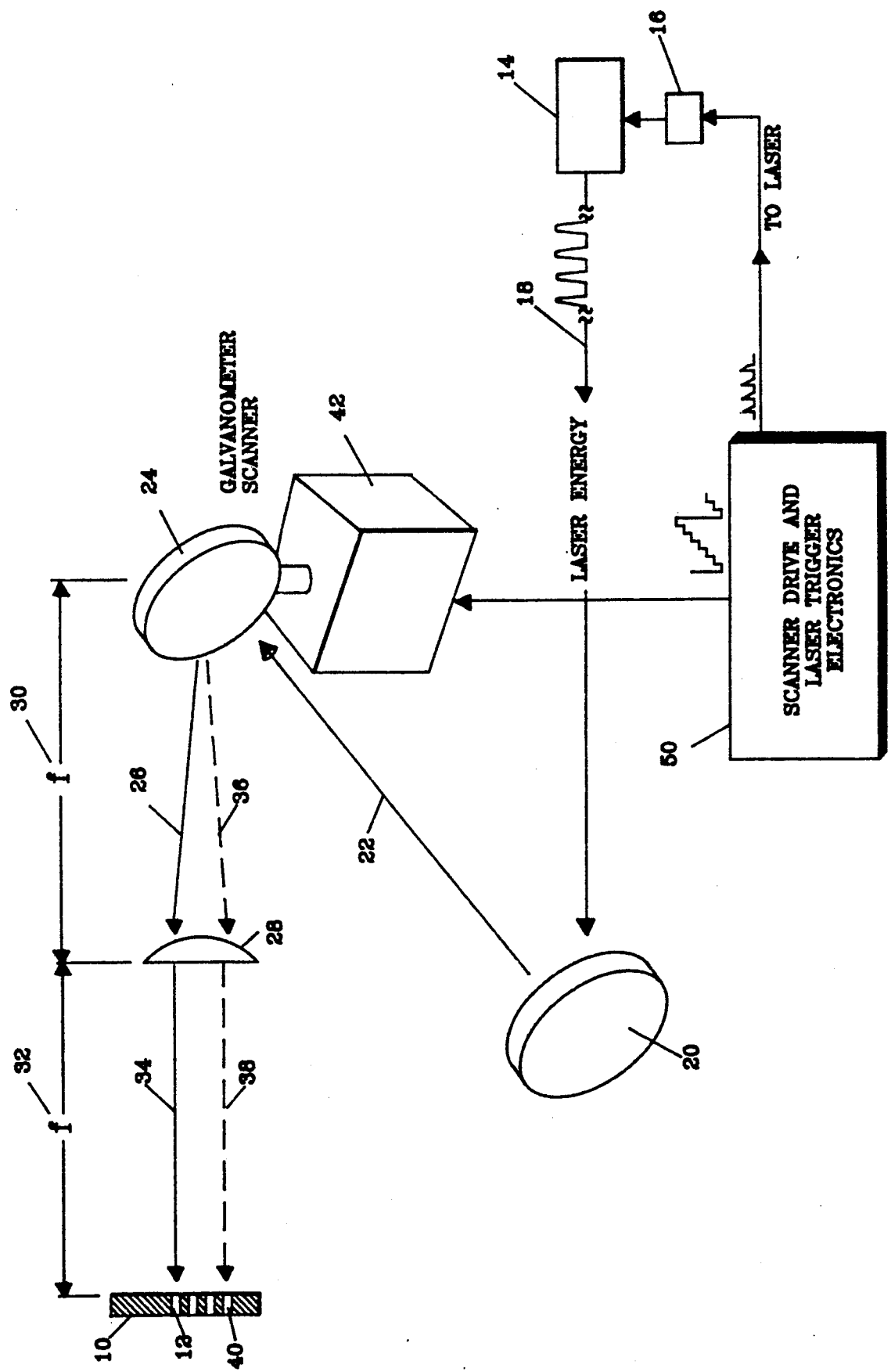

LASER DRILLING

TECHNICAL FIELD

The invention relates to drilling of small holes using a focused laser beam, and in particular to drilling of holes at a plurality of closely space locations.

BACKGROUND OF THE INVENTION

Gas turbine blades operating in a hot environment often are cooled with air passing from inside the blade out through cooling air holes. A multiplicity of these cooling air holes are drilled through the material of the blade at closely spaced locations. Typically there can be 400 such holes in a single blade.

A known method of drilling these holes uses a pulsed laser beam. In accordance with such procedure a high power beam is focused on the material at a location where the hole is to be drilled. The laser is repetitively pulsed until the hole is drilled through the material. In such a manner, 0.6 mm holes can be drilled through a 2 mm thickness of 5544 waspalloy (a nickel based alloy) using 630 microseconds pulses. Each pulse has an energy level of 6 joules with a pulse rate being on the order of 5 Hz. After completion of a single hole the beam is refocused at the next location to drill the next hole.

With a large number of holes being drilled it is desirable to increase the speed of drilling. The laser is capable of operation at a higher frequency. However, effective drilling cannot be carried out at these higher rates. At 5 Hz the hole is drilled in 10 pulses, while increasing the rate to 50 Hz requires 15 pulses to accomplish the same drilling.

This additional energy goes into heating of the material. This raises the temperature of the bounding wall of the hole and increases the size of the heat affected zone. The rapid rate also provides less time for cooling between pulses.

Since the laser beam is being focused from a lens and has a shallow conical shape, the focus at the surface will not provide a precise focus at deeper locations. In practice, the beam striking the edge of the partially drilled hole at an acute angle reflects it down the hole where it impinges at the bottom, melting and vaporizing material. The higher temperature of the bounding walls makes them less reflective thereby further decreasing the efficiency of the operation. This also increases the chance of erratic sizing along the length of the hole.

SUMMARY OF THE INVENTION

A plurality of small holes are to be drilled at closely spaced locations. The laser is focused at a first location for a single pulse. It is then sequentially focused at a plurality of other locations for a single pulse at each location. It returns to the initial location and repetitively sequences throughout the plurality of locations so that the remaining holes are drilled between pulses occurring at the first hole.

BRIEF DESCRIPTION OF THE DRAWING

The Figure is a schematic illustration of the laser drilling arrangement.

DESCRIPTION OF THE PREFERRED EMBODIMENT

A portion of material 10 representing the wall of a hollow turbine blade is required to have a plurality of air cooling holes 12 drilled therein. Each of these holes is to be 0.6 mm in diameter through a wall thickness of 2 mm and with the holes being at a spacing of 2 mm. As illustrated, 8 holes are being drilled in one operation.

A pulsed laser 14 operating under laser control 16 sends out a pulsed beam of laser energy 18. The beam is reflected from turning mirror 20 sending a beam 22 to a second turning mirror 24. From this second turning mirror the beam 26 is directed through a plano convex lens 28 focusing on the surface of material 10.

The distance 30 from turning mirror 24 to lens 28 is one focal length. In the trial setup this focal length was 12.7 cm with the same focal length 32 of 12.7 cm existing between the lens and the surface of the material. Using one focal length between the mirror and the lens is required if parallel holes are to be drilled.

As illustrated in the drawing, the centerline of the beam is shown. In actuality, a broad beam of parallel rays is sent from the laser past mirror 20 and 24 and to the lens. Thereafter, the lens focuses the beam forming a conical shape to concentrate the energy over a focal point of the desired size to drill the 0.6 mm hole. It can be appreciated that when the direction of approach of all components of the beam are parallel in a common direction, they are focused to a single spot. When the angle with respect to the axis of the lens is changed, as by rotation of the mirror, the focus of all portions of the beam is at an alternate location.

It can be appreciated therefore, that with a particular angular position of mirror 24, beam 26 is focused by lens 28 to produce a beam represented by centerline 34 to cause the energy to focus at the surface of the material where hole 12 is illustrated. By rotating the mirror 24 to another angle, beam 36 is focused by lens 28 to produce a beam represented by its centerline 38 focusing at the surface of the material where hole 40 is illustrated. By appropriate orientation of mirror 24 the beam may be focused at any one of the intermediate locations where the holes are shown.

The turning mirror 24 is rotated to the desired position by galvanometer scanner 42. This is operative to drive the mirror to each one of the focused locations.

Scanner drive and laser trigger control 50 is operative to control the scanner to each one of its selected positions and to coordinate the position with the pulse from laser 14. When starting the drilling, the turning mirror 24 is adjusted to focus the laser pulse at the surface near hole 12. The laser trigger electronics permits one pulse to be delivered at that point and rotates the mirror to the surface where one of the other holes is to be drilled. After a short time delay to permit the mirror to settle out, a second laser pulse is delivered at that location.

In this manner the laser is sequentially stepped to each location corresponding to a hole to be drilled. It thereafter returns to the first location for a second single pulse at that location. Continuing this operation the single pulses are delivered sequentially to the plurality of holes until drilling is completed at all locations (only 4 holes illustrated).

While each hole is still receiving pulses at the 5 Hz rate, the laser is operated to deliver pulses at a 40 Hz rate with 6 joules per pulse and with each pulse lasting for 630 microseconds. It can be seen that the same drilling rate as with conventional procedures are carried out in each hole and accordingly the efficiencies and advantages of the limited rate accrue for each of the holes. However, by utilizing the time between pulses at any one location to drill holes at other locations, the output of the drilling apparatus is increased eightfold.

The distance 30 may be set at less than the focal length. In such a case the plurality of holes will have centerlines which diverge from the surface. Conversely, setting the distance 30 greater than the focal length will produce holes converging from the surface.

We claim:

1. A method of laser drilling a plurality of holes at closely spaced locations in a material, wherein each hole requires a multiplicity of pulses for the drilling thereof, with a pulsed laser beam comprising:
    focusing said laser beam at a first location for a first pulse;
    sequentially focusing said laser beam at each other location for a subsequent pulse at each location;
    repetitively focusing said laser beam at said first location for a subsequent pulse and repetitively and sequentially focusing said laser beam at each other location for subsequent pulses at each location.

2. The method of claim 1 wherein the step of focusing said laser beam at a first location comprises:
    reflecting said laser beam with a mirror to a lens at a first angle with respect to said lens.

3. The method of claim 2 wherein the step of sequentially focusing said laser beam at each other location comprises:
    moving said mirror, and reflecting said laser beam to said lens at a plurality of different angles with respect to said lens.

4. The method of claim 3 wherein the step of moving said mirror comprises:
    rotating said mirror around an axis.

5. The method of claim 1 including:
    delivering said pulses at each location at a frequency of five to ten Hz.

6. The method of claim 3 including:
    locating said mirror a distance from said lens equal to the focal length of said lens, whereby parallel holes will be drilled.

7. The method of claim 3 including:
    locating said mirror a distance from said lens less than the focal length of said lens, whereby divergent holes will be drilled.

8. The method of claim 3 including:
    locating said mirror a distance from said lens greater than the focal length of said lens, whereby convergent holes will be drilled.

* * * * *